United States Patent
Hempfling et al.

(10) Patent No.: US 6,293,744 B1
(45) Date of Patent: Sep. 25, 2001

(54) FASTENER SYSTEM INCLUDING A FASTENER AND A CAP

(75) Inventors: Dave C. Hempfling, Chicago; George G. Dewey, Palatine; Sigismund G. Paul, Park Ridge, all of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/595,568

(22) Filed: Jun. 14, 2000

(51) Int. Cl.[7] .............................. F16B 19/00; F16B 33/00
(52) U.S. Cl. ..................... 411/372.5; 411/375; 411/377
(58) Field of Search .................. 411/372.5, 372.6, 411/373, 377, 430, 431, 910, 375

(56) References Cited

U.S. PATENT DOCUMENTS

| | | |
|---|---|---|
| 3,134,290 * | 5/1964 | Jentoft ............................ 411/377 |
| 3,897,712 | 8/1975 | Black . |
| 4,041,834 | 8/1977 | Herkes et al. . |
| 4,295,767 | 10/1981 | Temple . |
| 4,452,556 * | 6/1984 | Nelson et al. ................... 411/377 |
| 4,482,278 * | 11/1984 | Dorn ................................ 411/377 |
| 4,736,481 | 4/1988 | Hulsey . |
| 4,813,833 | 3/1989 | Haab . |
| 4,816,346 | 3/1989 | Hulsey . |
| 4,948,318 * | 8/1990 | Nottelmann et al. ............ 411/377 X |
| 5,156,509 * | 10/1992 | Wu .................................. 411/377 X |
| 5,338,141 | 8/1994 | Hulsey . |
| 5,544,992 | 8/1996 | Ciobanu et al. . |

* cited by examiner

Primary Examiner—Neill Wilson
(74) Attorney, Agent, or Firm—Lisa M. Soltis; Mark W. Croll; Donald J. Breh (57) ABSTRACT

A fastener system that includes a fastener with a longitudinally extending shank with a head on one end thereof, where the head has a first pattern formed thereon, and a cap that is configured and arranged to be seated upon the head, where the cap includes a second pattern formed on an interior surface thereof. This second pattern is adapted to cooperate with the first pattern, whereby rotational forces applied to the cap are transferred to the fastener via contact between the first and second patterns. Furthermore, the second pattern is defined by a closed figure that includes a plurality of outermost circumferential points located along a circle, with adjacent points being separated by a pattern distance that is greater than the length of an imaginary straight line drawn directly between the adjacent points. Several different configurations are available for the second pattern. Some examples of such configurations include generally star-shaped patterns, generally cross-shaped patterns, and other patterns also formed by a plurality of radially extending branches. Additionally, the second pattern may also be defined by a plurality of closed figures, such as a combination of generally pie-shaped components.

29 Claims, 8 Drawing Sheets

FASTENER SYSTEM INCLUDING A FASTENER AND A CAP

The present invention relates generally to a fastener system, and more particularly to such a system that includes a fastener with a longitudinally extending threaded shank and a cap that is configured and arranged to be seated upon a head of the threaded fastener.

BACKGROUND OF THE INVENTION

Today, fastener systems of the type that include a threaded shank and a cap are commonly used in many areas of construction. The most common fastener design is one which includes a threaded shank, a cap, and a sealing washer. One end of the threaded shank is typically formed into a hexagonal-shaped head, and the cap includes an inner surface that includes a corresponding hexagonal-shaped recess, which creates a female component configured to mate with the male component created by the hexagonal-shaped head. The exterior surface of the cap typically includes another hexagonal-shaped projection that is larger than the hexagonal-shaped head of the shank. Prior to being used for fastening, the threaded shank and the cap are connected together, along with the sealing washer, which is positioned at the base of the cap and below the head. After the shank, the cap and the sealing washer are assembled together, they can be used for fastening together other components.

In operation, a screw gun, a socket wrench, or other tightening tool, is positioned upon the hexagonal-shaped projection of the cap, and the cap is rotated. Since the female hexagonal-shaped recess on the interior of the cap mates with the male hexagonal-shaped head of the shank, the shank is rotated and is driven into the components being affixed together when the hexagonal-shaped projection on the cap is rotated by the socket wrench. Upon full tightening, the sealing washer is compressed by the underside of the cap and/or the underside of the head, and seals about the shank.

In the construction of metal buildings, such fastener systems are the primary means for securing many of the components together. For example, such fastener systems are commonly used for holding structural members together, for securing metal sidewall panels to the structural portions of the building, and even for securing the insulation and the roof panels to the bar joists or purlins.

The exterior walls and roof of such metal buildings can be exposed to many potentially harmful environmental elements, such as sunlight, acid rain, snow, and/or sleet (depending upon the region in which the building is located) These environmental elements, among others, can cause damage such as rust corrosion, paint chalking, fading, etc.

In order to alleviate these problems, non-corrosive fasteners or non-corrosive headed fasteners are typically used. Frequently, only the cap and/or the shank head of the fastener needs to be of a non-corrosive material because only the head of the fastener and the cap are exposed to the harmful effects of the outside environment. Examples of such non-corrosive materials are stainless steel and aluminum. Zinc or another non-carbon alloy may also be used. Although these non-corrosive materials are less prone to corrosion than carbon steel, they are also softer than heat treated carbon steel. Accordingly, problems, such as fastener failures, may arise when using such softer materials in traditional fastener designs.

Most of the fastener failures result from the high torque used during tightening. One common type of failure is that in which the corners of the hexagonal-shaped head of the shank are sheared off during tightening. Such failure makes further tightening difficult. A second, and more severe, type of failure is that in which the softer metal of the hexagonal-shaped head becomes detached from its base, which is typically made of carbon steel. The area in which the base is connected to the hexagonal-shaped head is typically round. Accordingly, such a failure makes further tightening (or unscrewing) impossible. Additionally, removal of the failed fastener is also extremely difficult because of the rounded shape of the remaining shaft.

Accordingly, one object of the present invention is to provide an improved fastener system of a design that prevents the torsional failure problems discussed above.

Another object of the present invention is to provide a non-corrosive fastener, or a non-corrosive headed fastener, in which the problems associated with the use of a hexagonal-shaped head mating with a hexagonal-shaped cap interior are eliminated.

An additional object of the present invention is to provide a fastener cap in which the pattern formed on the interior thereof is of a shape other than hexagonal.

A further object of the present invention is to provide an improved fastener cap and fastener system capable of withstanding high torque.

An additional object of the present invention is to provide a high torque fastener fastener cap and fastener system that is corrosion-resistant.

A further object of the present invention is to provide a fastener and fastener system where at least the head is made of a non-corrosive material, and that is also capable of withstanding high torque.

These and other objects of the present invention are discussed or will be apparent from the following detailed description of the present invention.

BRIEF SUMMARY OF THE INVENTION

The above-listed objects are met or exceeded by the present fastener cap and fastener system, which each feature a pattern formed within the cap that is of a shape other than hexagonal, whereby the problems associated with the use of hexagonal-shaped patterns are essentially eliminated.

More specifically, the present invention provides a fastener system that includes: a fastener with a longitudinally extending shank with a head on one end thereof, where the head has a first pattern formed thereon; and a cap that is configured and arranged to be seated upon the head, where the cap includes a second pattern formed on an interior surface thereof This second pattern is adapted to cooperate with the first pattern, whereby rotational forces applied to the cap are transferred to the fastener via contact between the first and second patterns. Furthermore, the second pattern is defined by a closed figure that includes a plurality of outermost circumferential points located along a circle, with adjacent points being separated by a pattern distance that is greater than the length of an imaginary straight line drawn directly between the adjacent points.

As described below, several different configurations are available for the second pattern. Some examples of such configurations include generally star-shaped patterns, generally cross-shaped patterns, and other patterns also formed by a plurality of radially extending branches. Additionally, the second pattern may also be defined by a plurality of closed figures, such as a combination of generally pie-shaped components.

BRIEF DESCRIPTION OF THE SEVERAL VIEWS OF THE DRAWINGS

Preferred embodiments of the present invention are described herein with reference to the drawings wherein.

DETAILED DESCRIPTION OF THE INVENTION

Figure 1:
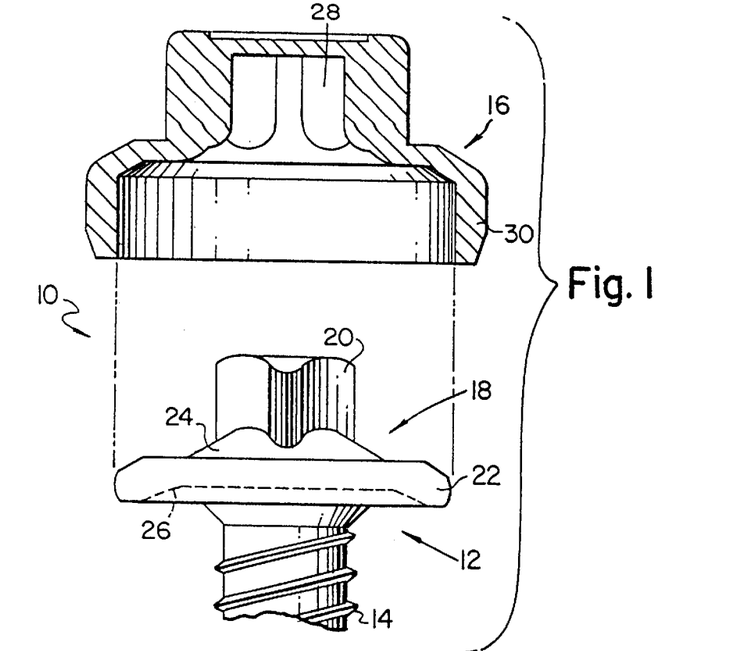
FIG. 1 shows a side view of the present fastener and a cutaway view of the present cap, prior to these components being assembled together.

Referring now to FIGS. 1–6, the first embodiment of the present fastener system will now be described. FIG. 1 depicts a cross-sectional view of cap 16 and a side view of shank 12, which includes threads 14. The shank 12 extends longitudinally, and includes a head 18 on one end and a pointed tip (not shown) on the other end. The head 18 includes a first pattern 20 that protrudes above a skirt 22. Additionally, the head 18 also preferably includes a tapered platform 24 situated below the first pattern 20, and an indentation 26 (shown in doted line) that is recessed within the lower surface of the skirt 22.

The cap 16 includes a second pattern 28 that is recessed within the interior of the cap. The second pattern 28 is configured to cooperate with the first pattern 20 in a male/female arrangement whereby the recessed second pattern 28 may be considered as the female component and the protruding first pattern 20 may be considered as the male component. Various examples of specific designs for the first and second patterns will be described more fully below. The cap 16 further includes an annular flange 30, the interior diameter of which is slightly larger than the exterior diameter of the skirt 22 of the head 18 such that the interior of the flange 30 may be seated around the exterior of the skirt 22.

Figures 2, 3:
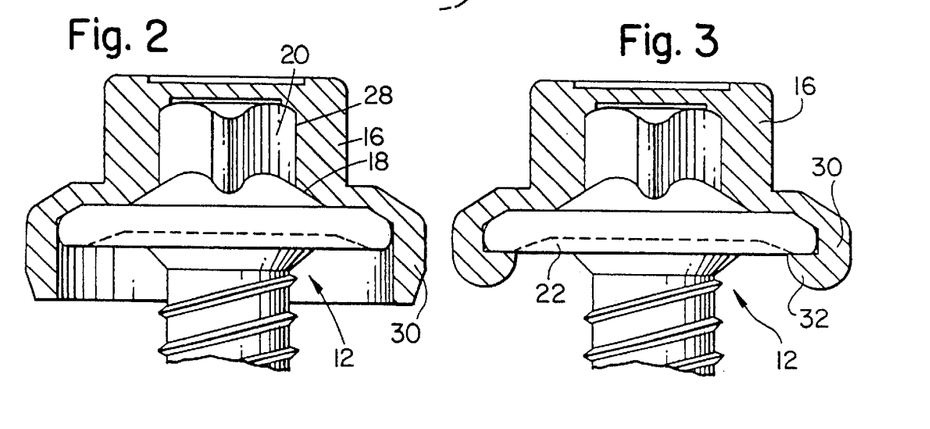
FIG. 2 shows the first step of the fastener system assembly process in which the cap is seated upon the head of the fastener.
FIG. 3 shows the second step of the fastener system assembly process in which the lower edges of the cap are crimped about the base of the head.

A shown in FIG. 2, the cap 16 is placed upon the head 18 of the threaded shank 12 so that the first pattern 20 is matingly seated within the second pattern 28. Referring now to FIG. 3, the lowermost portion 32 of the annular flange 30 is crimped around the skirt 22 of the shank 12 so that the cap 16 and the shank 12 are now affixed together. This crimping may form a smooth radius, as shown, or notches may optionally be crimped into the flange 30 to create an anti-stripout or an anti-backout surface.

Figure 4:
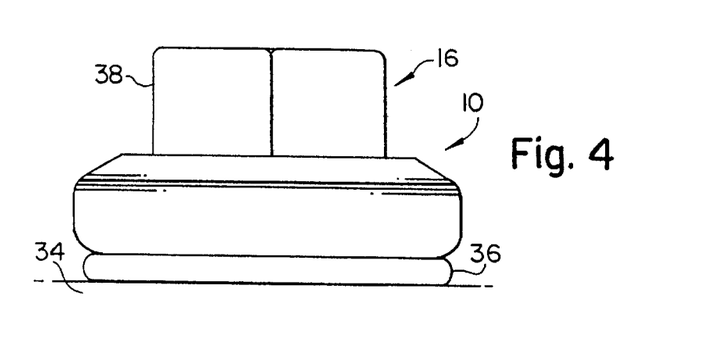
FIG. 4 is a side view of the fully assembled fastener system of the present invention, including a sealing washer.

FIG. 4 shows the fastener assembly 10 affixed to a substrate 34 (such as a metal building panel) with an elastomeric sealing washer 36 compressed between the fastener assembly 120 and the substrate 34. This elastomeric sealing washer 36 serves to prevent water from leaking into the hole (in the substrate 34) within which the shank 12 is seated.

Figure 5:
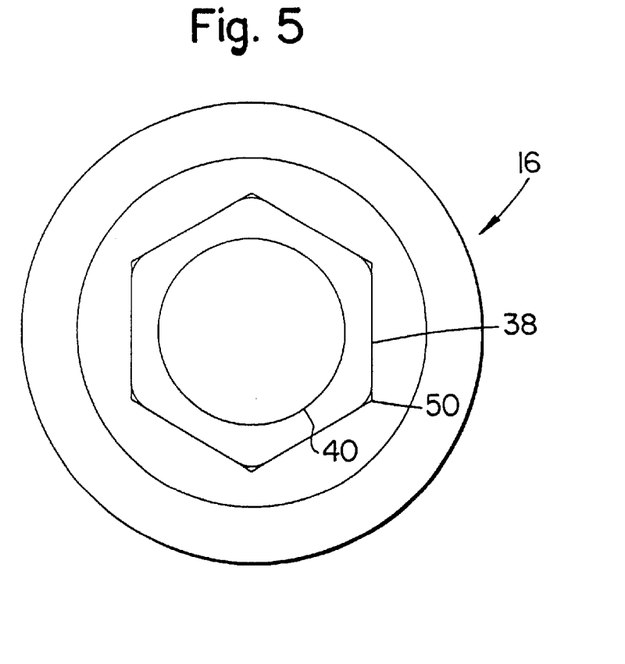
FIG. 5 is a top view of the cap of the present invention, showing the exterior surface thereof.

Referring now to FIG. 5, a top view of a preferred form of the cap 16 is shown. Preferably, the top of the cap 16 includes a hexagonal-shaped protrusion 38 (see also FIG. 4) extending longitudinally therefrom. The hexagonal-shaped protrusion 38 is configured so that a socket wrench, or other similar tool, can be mated with the protrusion 38 to enable the fastener assembly 10 to be screwed into a substrate. It should be noted that while a hexagon is the preferred shape for this protrusion 38, other shapes are also contemplated as being within the scope of the invention. Preferably, the protrusion 38 also includes a circular depression 40 located therein.

Figure 6:
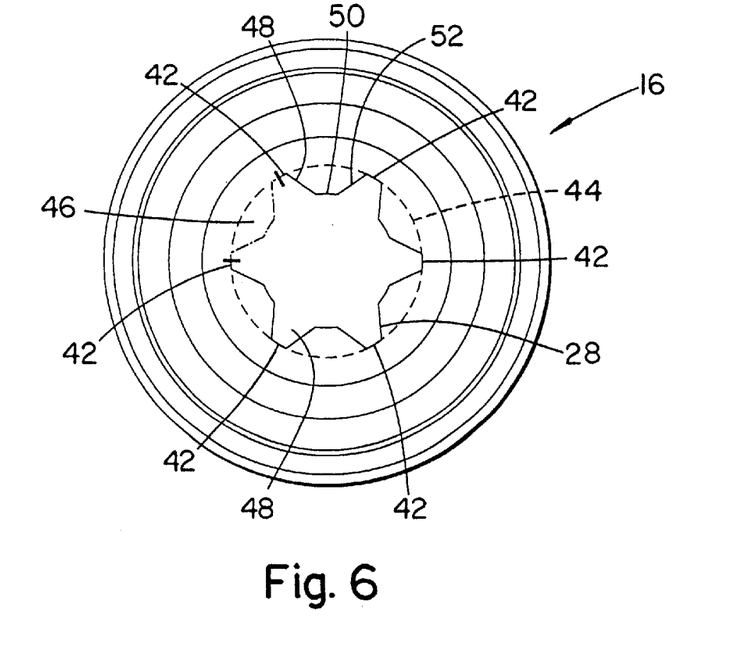
FIG. 6 is a bottom view of the cap of a first embodiment of the present invention, showing the interior surface thereof.

FIG. 6 shows a bottom view of the cap 16 including the first embodiment of a second pattern 28. This second pattern 28 is recessed into the bottom of the cap 16, and is defined as a generally closed figure that includes a plurality of outermost circumferential points 42. The outermost points 42 are located along an imaginary circle 44. The length of the surfaces connecting adjacent ones of the outermost points 42 will be referred to as the pattern distance 46. That is, in this embodiment, the pattern distance 46, which is shown as a dot dash line, is the sum of the lengths of surfaces 49, 50, and 52, plus half of the distance of the line upon which point 42 is located. In this case, surfaces 49 and 52 are straight lines that are equal to each other in length, and surface 50 is a curved inner peripheral surface formed by the length of an arc of a second circle, where this second circle is smaller than the imaginary circle 44.

Figure 7:
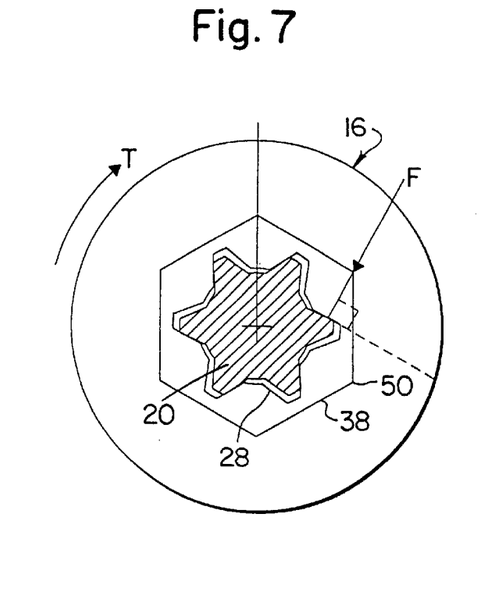
FIG. 7 is a cutaway view showing the first embodiment of the first pattern mated with the second pattern in order to illustrate the direction of the force.

The FIG. 6 embodiment may be considered as being generally star-shaped, with a plurality of radially extending branches 48. In this embodiment, each of the branches 48 is truncated by a relatively straight surface that crosses one of the outermost circumferential points 42. The FIG. 6 embodiment shows six branches 48, and as shown in FIG. 7, these branches, which are on the inner surface of the cap 16, are arranged so that each branch is centered along a straight wall of the hexagonal protrusion 38 on the outer surface of the cap 16. Such an orientation of the branches is preferred since forces, such as forces "F" (described more fully below when comparing FIGS. 7 and 8), are applied in a more perpendicular manner than with other orientations. However, it is also contemplated that a different number of branches may be used, and that the branches may be orientated in a different manner, such as having branches directed towards the corners 50 of hexagonal protrusion 38 (see FIG. 5). Although, while other orientations should still operate properly, they do operate with slightly less ultimate torque.

Preferably, the number of branches is a multiple of the total number of sides between the corners 50, i.e., for a hexagonal-shaped protrusion, such as protrusion 38, the number of branches is preferably 6, 12. 18, etc. However, if desired, the number of branches may also be varied without regard to the total number of sides between corners.

Figure 8:
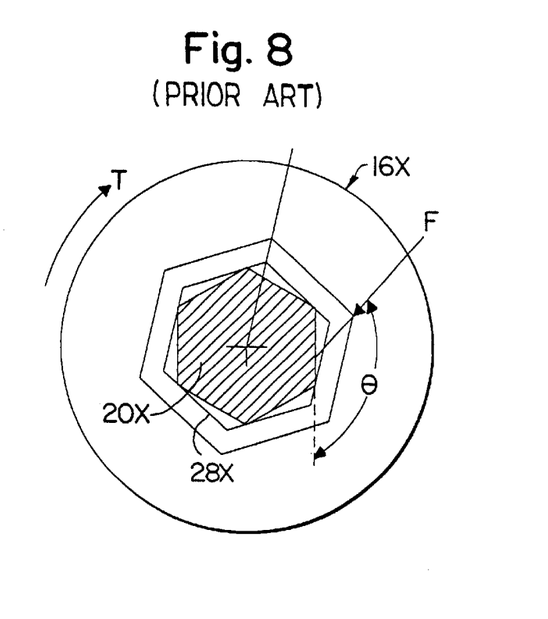
FIG. 8 is a view, similar to that of FIG. 7, of a prior art fastener.

Referring now to FIGS. 7–10, some of the benefits of the present invention will be explained. FIG. 7 shows a bottom view of the cap 16, including the second pattern 28, and a cross-sectional view of the first pattern 20 (of the threaded shank 12 of FIG. 1), where the first pattern 20 is seated within the second pattern 28. FIG. 8 shows a similar view of a prior art device with a hexagonal first pattern 20X for mating with a hexagonal second pattern 28X of a cap 16X. In FIGS. 7 and 8, arrows T each represent the torque and arrows F each represent the direction from which a force is applied from the second pattern (28 or 28X) to the first pattern (20 or 20X).

As can be seen from comparing FIG. 7 with FIG. 8, the force F in the present invention is applied to the second pattern 20 in a more perpendicular fashion than that applied to the second pattern 20X of the prior art fastener. In the prior art fastener shown in FIG. 8, the force F is not applied to the second pattern 20X in a perpendicular manner, but is instead applied at an angle θ. Because the force of the present invention is applied in a generally perpendicular manner, more torque can be produced in the present invention than in the prior art design of FIG. 8 without stripping or damaging the first pattern 28 of the cap 16, even when the cap is made of a relatively soft non-corrosive material.

Figure 9:
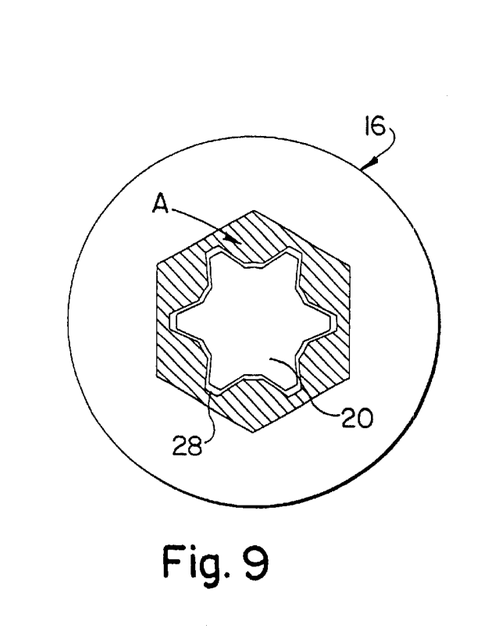
FIG. 9 is a cutaway view showing the first embodiment of the first pattern mated with the second pattern in order to illustrate the material strength of the wall of the second pattern.
Figure 10:
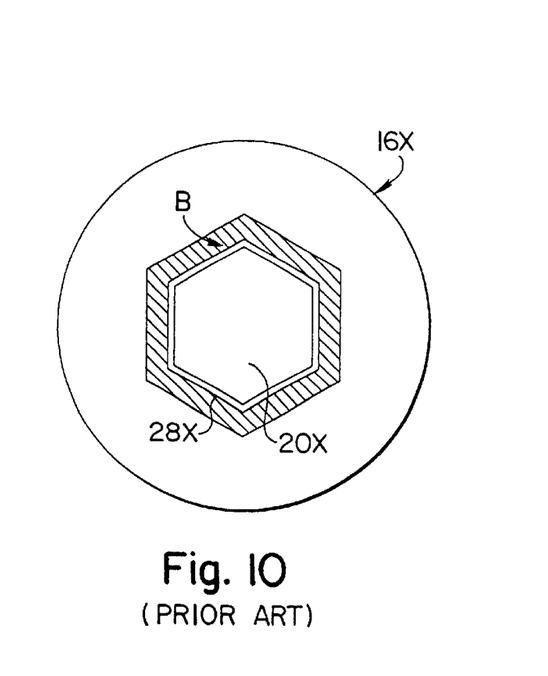
FIG. 10 is a view, similar to that of FIG. 9, showing a prior art fastener.

FIG. 9 shows a partially cross-sectional top view of the cap 16 of the present invention, including the second pattern 28, with the first pattern 20 seated therein. FIG. 10 shows a similar view of prior art cap 16X, including second pattern 28X, with the first pattern 20X seated therein. As can be seen by comparing the size of area A of FIG. 9 with the size of area B of FIG. 10, the cap of the present invention of FIG. 9 has a larger material volume in each area A than that of each area B of the prior art fastener of FIG. 10. Such an increase in material volume of the present invention helps to increase the material strength of the cap, which also reduces the amount that the second pattern of the cap can be stripped, even when the cap is made from a relatively soft non-corrosive material.

It is important to note that while the embodiment discussed above, as well as those embodiments that will be discussed below, each include a first pattern 20 and a second pattern 28 that are identically shaped (except that the second pattern 28 should be slightly larger than the first pattern 20), this need not be the case. It is contemplated as being within the scope of the invention that the second pattern may be of a different shape than that of the first pattern 20. The prime consideration is that when the first and second patterns are matingly connected together in a male/female arrangement, the second pattern 28 must be able to transfer rotational forces to the first pattern 20.

Referring now to FIGS. 11–25, each of these figures show a different embodiment of the second pattern 28 of the present cap 16. As mentioned above, the associated first pattern of the head may be of the same shape as the second pattern, or it may be shaped differently, as long as the two patterns can cooperate to transfer rotational forces. In FIGS. 11–25, for the sake of simplicity, the index numbering of the each of the components of the first embodiment, such as second pattern 28, outermost points 42, etc., has been carried over to these embodiments wherever practical. The primary difference between the embodiments of FIGS. 11–25 and the first embodiment of FIGS. 1–6 resides in the shape of the second pattern 28. Therefore, descriptions of the other components of each of these embodiments will be omitted. The shape of the second pattern of each of the embodiments depicted in FIGS. 11–25 will be described briefly below.

Figure 11:
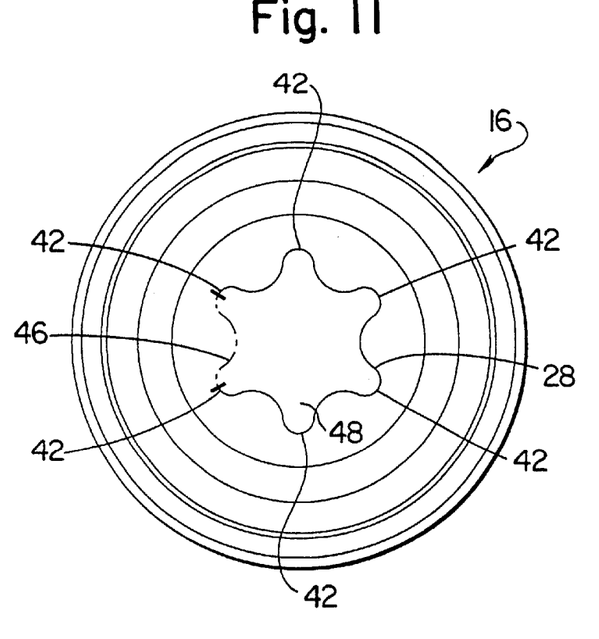
FIG. 11 is a bottom view of the cap of a second embodiment of the present invention, showing the interior surface thereof.

FIG. 11 depicts the second embodiment of the present cap 16. As can be seen from a review of the shape of the second pattern 28 of this embodiment, this version of the second pattern is also generally star-shaped with a plurality of outermost points 42 positioned along a circle. As in the first embodiment, each of these outermost points 42 is located at the end of a branch 48. In this embodiment, the surface creating the pattern distance 46 is a generally curved inner peripheral surface that is generally concave. Furthermore, in the area of the outermost points 42, each branch 48 includes a radiused outer peripheral surface. Once again, in this embodiment, as well as in the embodiments of FIGS. 12–21, a dot-dash line is used to illustrate the pattern distance 46.

Figure 12:
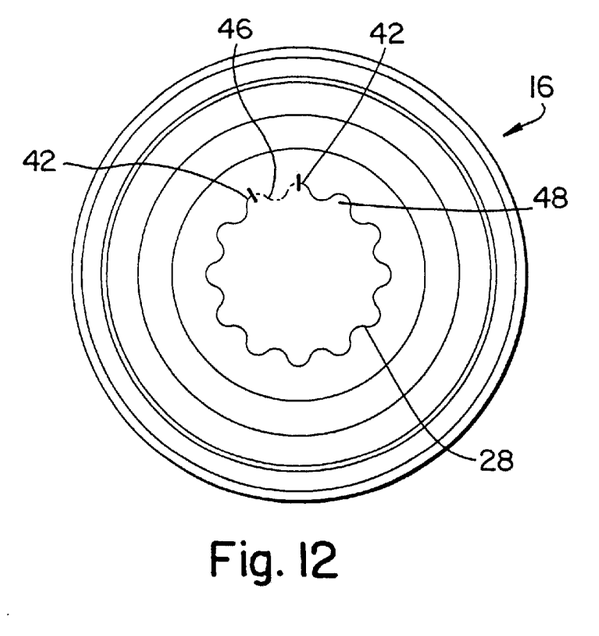
FIG. 12 is a bottom view of the cap of a third embodiment of the present invention, showing the interior surface thereof.

The third embodiment of the cap 16, which is shown in FIG. 12, is very similar to the second embodiment of FIG. 11, with the exception of the number of branches 48. In this embodiment there are twelve branches 48, as opposed to the six branches of the FIG. 11 embodiment. In all other aspects, the FIG. 12 embodiment is essentially the same as the FIG. 11 embodiment.

Figure 13:
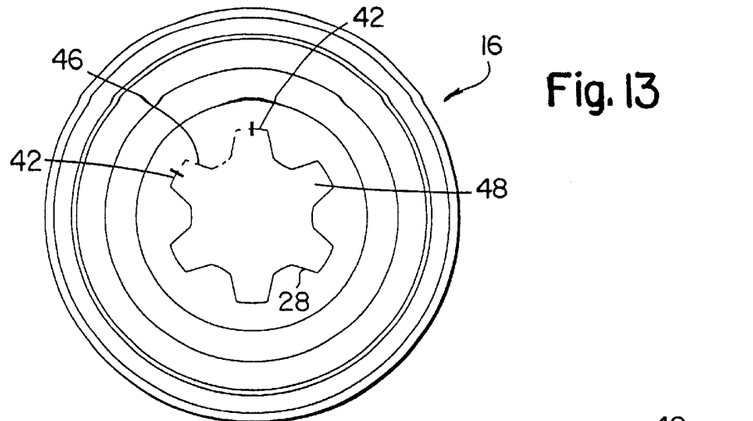
FIG. 13 is a bottom view of the cap of a fourth embodiment of the present invention, showing the interior surface thereof.

FIG. 13 depicts a fourth embodiment of the present cap 16. In this embodiment, the surfaces defining the pattern distance 46 are all straight lines. In this embodiment, the width of each of the branches 48 decreases when considered from the inner radial end to the outer radial end.

Figure 14:
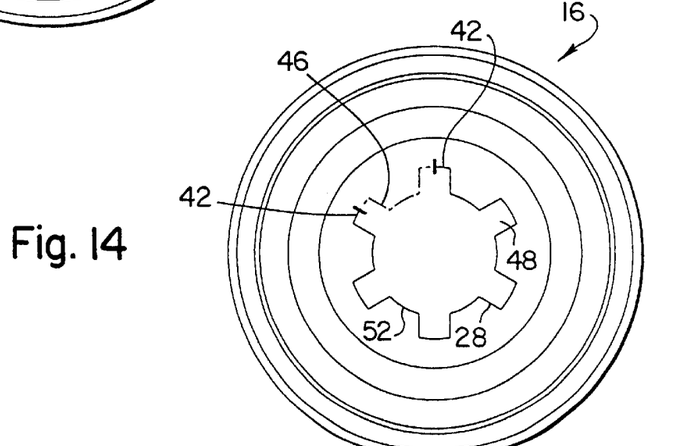
FIG. 14 is a bottom view of the cap of a fifth embodiment of the present invention, showing the interior surface thereof.
Figure 15:
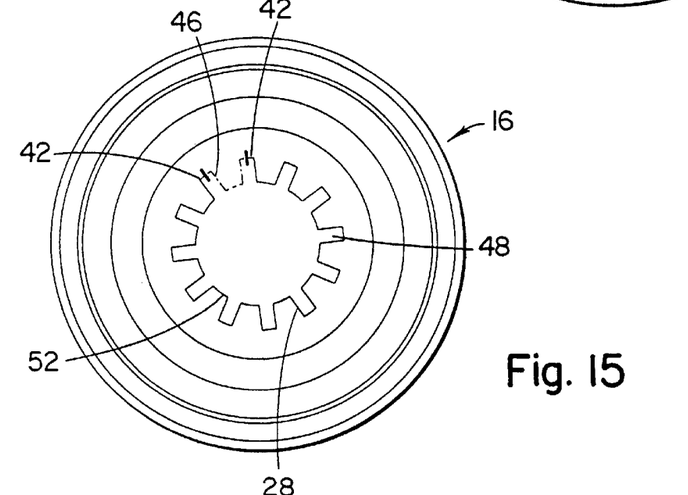
FIG. 15 is a bottom view of the cap of a sixth embodiment of the present invention, showing the interior surface thereof.

FIGS. 14 and 15 depict, respectively, the fifth and sixth embodiments of the present cap 16. The primary difference between these two embodiments resides in the number of branches 48. The FIG. 14 embodiment has six branches 48, while the FIG. 15 embodiment has twelve. Once again, it should be noted that the number of branches may be varied beyond six or twelve. In these two embodiments, each of the branches is of a relatively uniform width when considered from its radial inner end to its radial outer end. Furthermore, in these two embodiments, each of the branches 48 is connected to an adjacent branch via a convexly curved inner peripheral surface 52. Additionally, in these two embodiments, as well as in some of the other embodiments (such as FIG. 13), although the outer ends of the branches 48 are shown as being formed by two straight lines connecting at a point 42, each of these branches may also be formed with a curved surface at the outer end, or the outer end may even be truncated by a single straight line.

Figure 16:
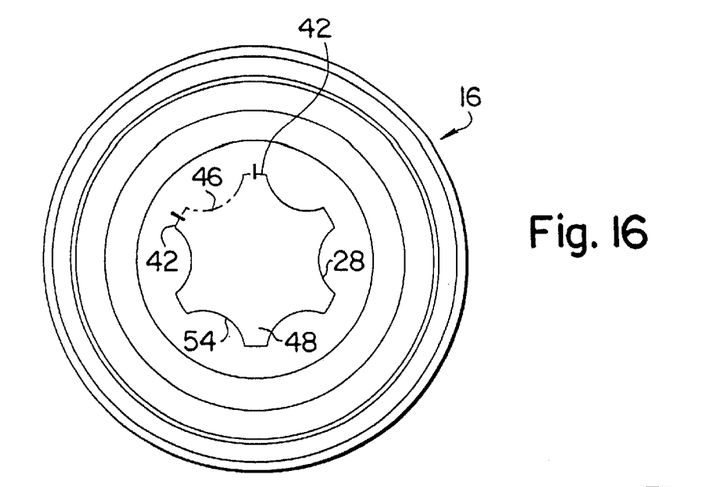
FIG. 16 is a bottom view of the cap of a seventh embodiment of the present invention, showing the interior surface thereof.

FIG. 16 shows the seventh embodiment of the present cap 16. In this embodiment, the pattern distance 46 is formed by both a curved line 54 and two straight line segments. The curved line 54 is a concavely curved inner peripheral surface of the second pattern 28. Furthermore, in this embodiment, each of the branches 48 is truncated at its outer radial end by a relatively straight surface.

Figure 17:
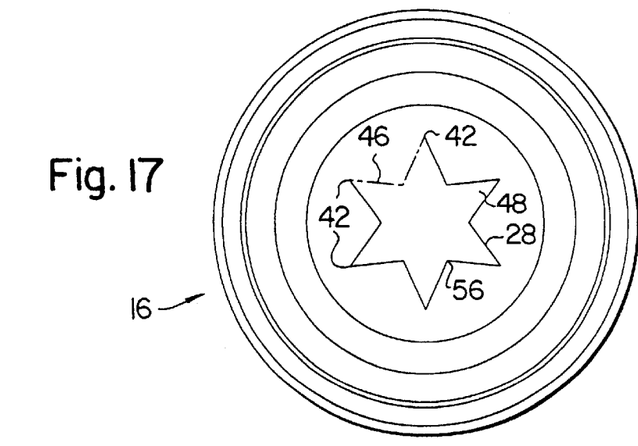
FIG. 17 is a bottom view of the cap of a eighth embodiment of the present invention, showing the interior surface thereof.
Figure 18:
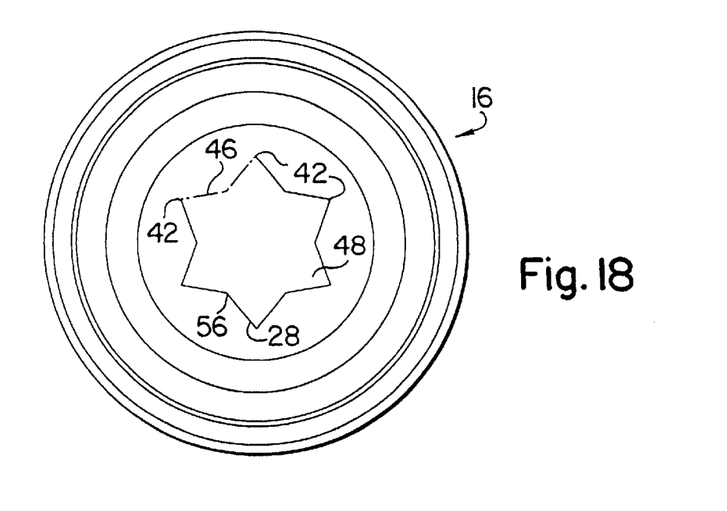
FIG. 18 is a bottom view of the cap of a ninth embodiment of the present invention, showing the interior surface thereof.

FIGS. 17 and 18 depict the eighth and ninth embodiments of the second pattern 28 of the present cap 16. These two versions of the second patterns 28 can also be considered as being generally star-shaped, as could several of the other embodiments (such as those shown in FIGS. 6, 11, 13, 14, and 16). In the two embodiments of FIGS. 17 and 18, the pattern distances 46 are defined by two relatively straight surfaces connected at an inner circumferential point 56. Each of these inner circumferential points 56 can be connected to define a second imaginary circle (not shown) that is smaller than the first imaginary circle created by connecting the outer circumferential points 42 (the first imaginary circle is not shown in this embodiment, but the first imaginary circle 44 of the first embodiment is shown in FIG. 6). As in some of the earlier embodiments, the branches 48 in these two embodiments all narrow towards the outer radial ends thereof.

The primary differences between the FIG. 17 embodiment and the FIG. 18 embodiment reside in the amount of taper and the length of each of the branches 48. The FIG. 17 embodiment has longer branches (i.e., branches that extend further towards the center of the figure) with more taper than those of the FIG. 18 embodiment. Thus, the branches of the FIG. 18 embodiment are defined by a wider angle (when considered from the outermost circumferential points 42) than those of the FIG. 17 embodiment.

Figure 19:
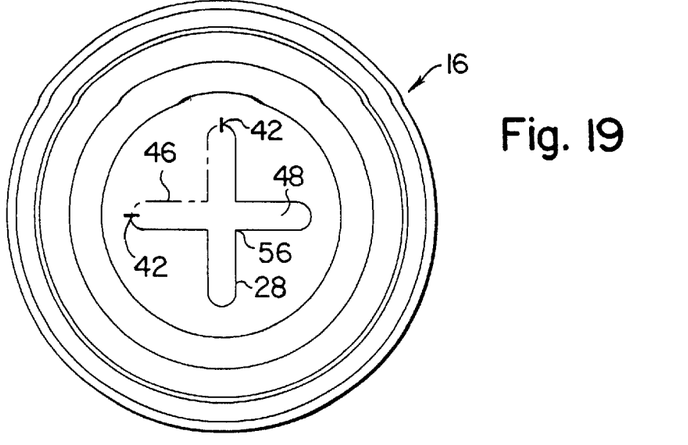
FIG. 19 is a bottom view of the cap of a tenth embodiment of the present invention, showing the interior surface thereof.

FIG. 19 shows the tenth embodiment of the present cap 16. In this embodiment the second pattern 28 includes four branches 48, such that it is generally cross-shaped. In this embodiment, the surfaces defining the pattern distance include both straight lines and curved surfaces. Although not shown, it is contemplated that the radially outer edges of each of the branches may be straight, instead of radiused as depicted in FIG. 19

Figure 20:
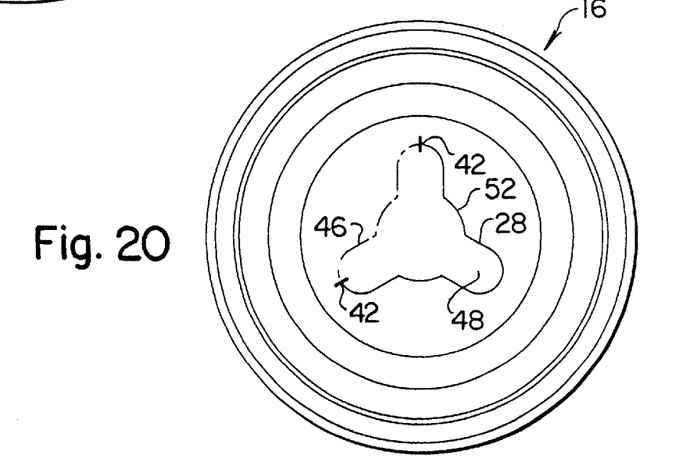
FIG. 20 is a bottom view of the cap of a eleventh embodiment of the present invention, showing the interior surface thereof.
Figure 21:
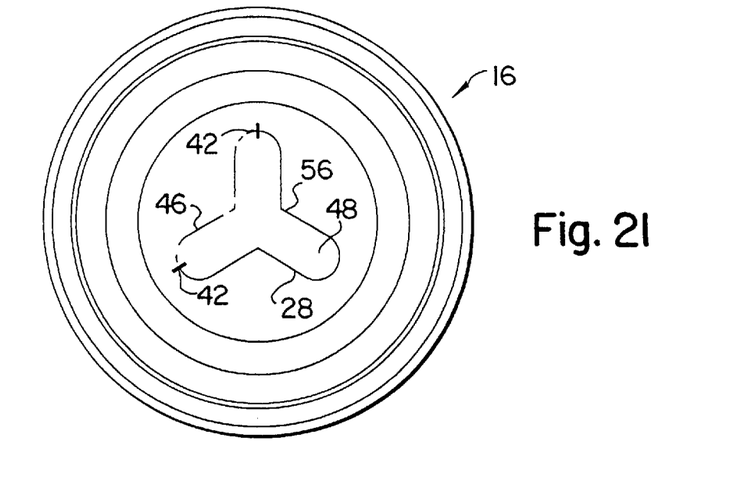
FIG. 21 is a bottom view of the cap of a twelfth embodiment of the present invention, showing the interior surface thereof.

FIGS. 20 and 21 show the eleventh and twelfth embodiments of the present cap 16. These two embodiments include a second pattern 28 that is defined by three branches 48. The primary difference between these two embodiments resides in the manner in which he branches are connected at their radially innermost peripheries. In the FIG. 20 embodiment, adjacent branches 48 are connected by a convexly curved inner peripheral surface 52, while in the FIG. 21 embodiment, the branches are connected by an inner circumferential point 56 (such as in the embodiments of FIGS. 17, 18, and 19).

FIGS. 22, 23, 24, and 25 each depict examples of embodiments of the present cap 16 in which the second pattern 28 is not formed of a single closed figure, but is instead formed of a combination of multiple closed figures. In each of these embodiments of FIGS. 22–25, the second pattern 28 is formed by a number of generally pie-shaped components 58, where each of these components is generally triangular. Moreover, each of these components 58 includes a pointed edge 60 that faces radially inwardly. As in the earlier embodiments described above, the second pattern 28 of the embodiments of FIGS. 22–25 is also recessed within the interior surface of the bottom of the cap 16.

Figure 22:
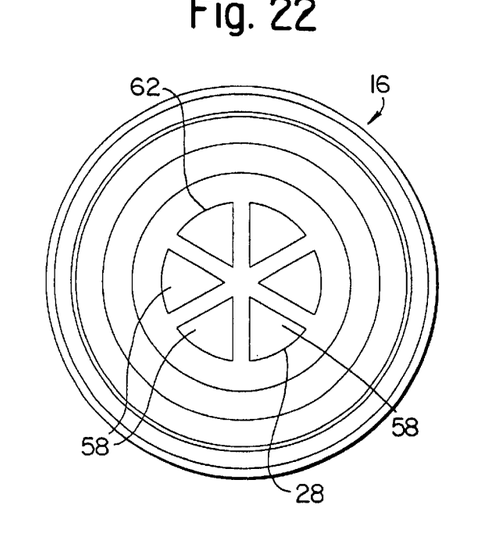
FIG. 22 is a bottom view of the cap of a thirteenth embodiment of the present invention, showing the interior surface thereof.
Figure 23:
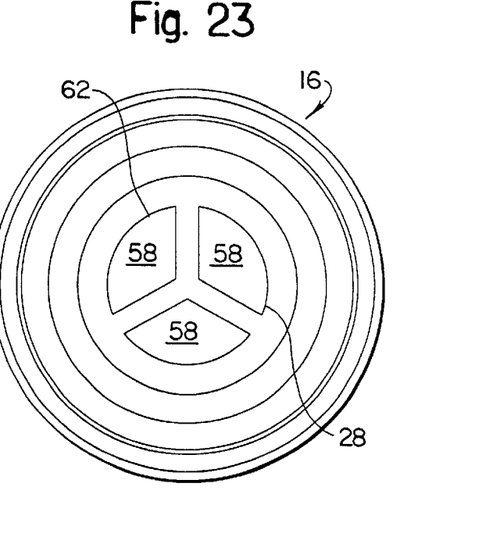
FIG. 23 is a bottom view of the cap of a fourteenth embodiment of the present invention, showing the interior surface thereof.
Figure 24:
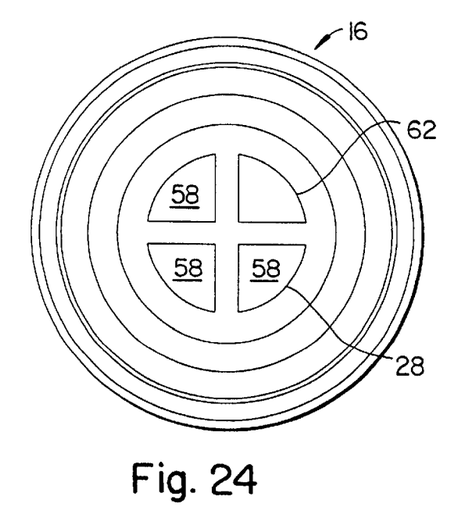
FIG. 24 is a bottom view of the cap of a fifteenth embodiment of the present invention, showing the interior surface thereof.
Figure 25:
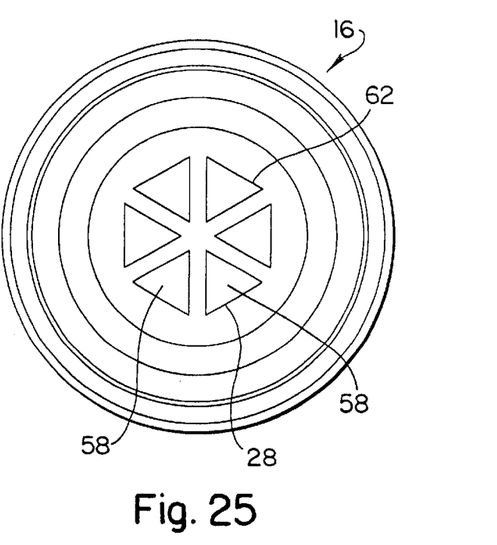
FIG. 25 is a bottom view of the cap of a sixteenth embodiment of the present invention, showing the interior surface thereof.

One difference among the embodiments of FIGS. 22–25 resides in the number of pie-shaped components 58. FIG. 22 and FIG. 25 each includes six pie-shaped components 58, FIG. 23 has three, and FIG. 24 has four. An additional difference among these embodiments is that the outer peripheral surface 62 of each of the components 58 may be curved, as in FIGS. 22–24, or straight, as in FIG. 25. Although not shown, the embodiments of FIGS. 23 and 24 may be modified to include straight outer peripheral surfaces 28, such as those shown in the FIG. 25 embodiment.

While several particular embodiments of the fastener system and fastener cap of the present invention have been shown and described, it will be appreciated by those skilled in the art that changes and modifications may be made thereto without departing from the invention in its broader aspects and as set forth in the following claims.

What is claimed is:

1. A fastener system comprising:

a fastener including a longitudinally extending shank with a head on one end thereof, said head having a first pattern formed thereon;

a cap configured and arranged to be seated upon said head, said cap including a second pattern formed on an interior surface thereof and a third pattern on an exterior thereof, said second pattern being adapted to cooperate with said first pattern, whereby rotational forces applied to said cap are transferred to said fastener via contact between said first and second patterns, and said third pattern being of a different general shape than said second pattern and including a plurality of straight segments joined to each other by a plurality of corners; and said second pattern being defined by a closed figure including a plurality of outermost circumferential points located along a circle, with adjacent points being separated by a pattern distance that is greater than the length of an imaginary straight line drawn directly between said adjacent points;

wherein said second pattern is defined by a plurality of radially extending branches, and further wherein only a single one of said radially extending branches extends towards each of said straight segments of said third pattern.

2. The fastener system according to claim 1, wherein said first pattern is projected from said head of said fastener and said second pattern is recessed into said interior surface of said cap.

3. The fastener system according to claim 1, wherein said pattern distance between each set of said adjacent points is defined by at least one curved surface.

4. The fastener system according to claim 1, wherein said second pattern further includes a plurality of inner circumferential points located about a second circle.

5. The fastener system according to claim 4, wherein at least one straight line connects each of said outer circumferential points with an adjacent inner circumferential point.

6. The fastener system according to claim 4, wherein at least one curved line connects each of said outer circumferential points with an adjacent inner circumferential point.

7. The fastener system of claim 1, wherein said second pattern includes three of said branches.

8. The fastener system of claim 1, wherein said second pattern includes four of said branches, such that said second pattern is generally cross-shaped.

9. The fastener system of claim 1, wherein each of said branches is connected to an adjacent one of said branches by a curved inner peripheral surface.

10. The fastener system of claim 9, wherein each of said curved inner peripheral surfaces is generally concave.

11. The fastener system according to claim 1, wherein each of said radially extending branches includes a longitudinal center line that is generally perpendicular to said single one of said straight segments of said third pattern that said radially extending branch extends towards.

12. A fastener system comprising:
a fastener including a longitudinally extending shank with a head on one end thereof, said head having a first pattern formed thereon;
a cap configured and arranged to be seated upon said head, said cap including a second pattern formed on an interior surface thereof, said second pattern being adapted to cooperate with said first pattern, whereby rotational forces applied to said cap are transferred to said fastener via contact between said first and second patterns; and
said second pattern being defined by a closed figure including a plurality of outermost circumferential points located along a circle, with adjacent points being separated by a pattern distance that is greater than the length of an imaginary straight line drawn directly between said adjacent points;
wherein said second pattern is defined by a plurality of generally radially extending branches and each of said branches is connected to an adjacent one of said branches by a curved inner peripheral surface; and
further wherein each of said curved inner peripheral surfaces is generally convex.

13. The fastener system according to claim 12, wherein each of said branches is of a relatively uniform width when considered from a radial inner end to a radial outer end thereof.

14. The fastener system according to claim 13, wherein:
said curved inner peripheral surfaces are all sections of a single circle; and
each of said branches includes a radiused outer peripheral surface.

15. The fastener system of claim 1, wherein each of said branches includes a radiused outer peripheral surface.

16. The fastener system of claim 1, wherein each of said branches is truncated by a relatively straight surface.

17. The fastener system of claim 1, wherein each of said branches has a width that decreases when considered from a radial inner end to a radial outer end thereof.

18. The fastener system according to claim 1, wherein said second pattern is generally star-shaped.

19. A fastener system comprising:
a fastener including a longitudinally extending shank with a head on one end thereof, said head having a first pattern formed thereon;
a cap configured and arranged to be seated upon said head, said cap including a second pattern formed on an interior surface thereof, said second pattern being adapted to cooperate with said first pattern, whereby rotational forces applied to said cap are transferred to said fastener via contact between said first and second patterns; and
said second pattern being defined by a closed figure including a plurality of outermost circumferential points located along a circle, with adjacent points being separated by a pattern distance that is greater than the length of an imaginary straight line drawn directly between said adjacent points;
wherein said second pattern is defined by a plurality of generally radially extending branches such that said second pattern is generally star-shaped; and
wherein said generally star-shaped second pattern includes truncated outer peripheral branches and a semicircular inner peripheral surface for connecting each of said truncated peripheral branches to an adjacent one of said truncated peripheral branches.

20. The fastener system according to claim 19, wherein:
each of said truncated outer peripheral branches has a width that decreases when considered from a radial inner end to a radial outer end thereof; and
each of said semicircular inner peripheral surfaces is generally convex.

21. The fastener system according to claim 19, wherein:
each of said truncated outer peripheral branches has a width that decreases when considered from a radial inner end to a radial outer end thereof; and
each of said semicircular inner peripheral surfaces is generally concave.

22. A fastener system comprising:
a fastener including a longitudinally extending shank with a head on one end thereof, said head having a first pattern formed thereon;
a cap configured and arranged to be seated upon said head, said cap including a second pattern formed on an interior surface thereof, said second pattern being adapted to cooperate with said first pattern, whereby rotational forces applied to said cap are transferred to said fastener via contact between said first and second patterns; and
said second pattern being defined by a closed figure including a plurality of outermost circumferential points located along a circle, with adjacent points being separated by a pattern distance that is greater than the length of an imaginary straight line drawn directly between said adjacent points;
wherein said second pattern is defined by a plurality of generally radially extending branches, and each of said branches is of a relatively uniform width when considered from a radial inner end to a radial outer end thereof.

23. The fastener system according to claim 22, wherein:
said second pattern consists of four of said branches, such that said second pattern is generally cross-shaped; and
each of said branches includes a radiused outer peripheral surface.

24. The fastener system according to claim 22, wherein:
said second pattern consists of three of said branches; and
each of said branches includes a radiused outer peripheral surface.

25. A fastener system comprising:

a fastener including a longitudinally extending shank with a head on one end thereof, said head having a first pattern formed thereon;

a cap configured and arranged to be seated upon said head, said cap including a second pattern formed on an interior surface thereof and a third pattern on an exterior thereof, said second pattern being adapted to cooperate with said first pattern, whereby rotational forces applied to said cap are transferred to said fastener via contact between said first and second patterns, and said third pattern being of a different general shape than said second pattern; and said second pattern is not defined by a single polygon consisting solely of a plurality of planar sides, but is instead defined by a plurality of closed figures.

26. The fastener system of claim 25, wherein said plurality of closed figures are generally triangular.

27. The fastener system of claim 26, wherein each of said generally triangular-shaped closed figure has a pointed radially inwardly facing edge and a curved radially outwardly facing surface.

28. A fastener system comprising:

a fastener including a longitudinally extending shank with a head on one end thereof, said head having a first pattern formed thereon;

a cap configured and arranged to be seated upon said head, said cap including a second pattern formed on an interior surface thereof, said second pattern being adapted to cooperate with said first pattern, whereby rotational forces applied to said cap are transferred to said fastener via contact between said first and second patterns; and said second pattern is not defined by a single polygon consisting solely of a plurality of planar sides, but is instead defined by a plurality of closed figures that are each generally triangular;

wherein each of said generally triangular-shaped closed figures has a pointed radially inwardly facing edge and a relatively straight radially outwardly facing surface.

29. A fastener system comprising:

a fastener including a longitudinally extending shank with a head on one end thereof, said head having a first pattern formed thereon;

a cap configured and arranged to be seated upon said head, said cap including a second pattern formed on an interior surface thereof, said second pattern being adapted to cooperate with said first pattern, whereby rotational forces applied to said cap are transferred to said fastener via contact between said first and second patterns; and said second pattern being defined by a closed figure including a plurality of outermost circumferential points located along a circle, with adjacent points being separated by a pattern distance that is greater than the length of an imaginary straight line drawn directly between said adjacent points; and wherein said second pattern is generally star-shaped and is defined by a plurality of generally radially extending branches that each have a width that gradually decreases to a point when considered from a radial inner end to a radial outer end thereof.

* * * * *